United States Patent

Ishii et al.

[11] 4,284,175
[45] Aug. 18, 1981

[54] EMERGENCY STOP APPARATUS FOR ELECTRIC ELEVATORS

[75] Inventors: Toshiaki Ishii; Eiki Watanabe, both of Inazawa, Japan

[73] Assignee: Mitsubishi Denki Kabushiki Kaisha, Tokyo, Japan

[21] Appl. No.: 52,589

[22] Filed: Jun. 27, 1979

Related U.S. Application Data

[63] Continuation of Ser. No. 808,612, Jun. 21, 1977, abandoned.

[30] Foreign Application Priority Data

Jul. 5, 1976 [JP] Japan .................................. 51-79694

[51] Int. Cl.³ .............................................. B66B 5/02
[52] U.S. Cl. ................................................. 187/29 R
[58] Field of Search .......... 187/29; 318/275, 364–366, 318/368, 445, 479

[56] References Cited

U.S. PATENT DOCUMENTS

| | | | |
|---|---|---|---|
| 1,060,836 | 5/1913 | Gale, Sr. | 318/364 X |
| 2,637,834 | 5/1953 | Mignocchi | 318/368 |
| 3,078,392 | 2/1963 | Bollesen | 318/479 X |
| 3,283,236 | 11/1966 | Legg | 318/445 X |
| 3,439,249 | 4/1969 | Brendemuehl | 318/368 |
| 3,961,688 | 6/1976 | Maynard | 187/29 |

*Primary Examiner*—J. V. Truhe
*Assistant Examiner*—W. E. Duncanson, Jr.
*Attorney, Agent, or Firm*—Oblon, Fisher, Spivak, McClelland & Maier

[57] ABSTRACT

An emergency stop apparatus for electric elevators which comprises a DC motor for driving a cage and being controllingly driven by variable DC power source connected to an AC power source, a power stoppage memorizing circuit which detects the power stoppage of the AC power source and memorizes the power stoppage, a motor stopping circuit for stopping the motor when the power stoppage memorizing circuit operates, and a memory erasing circuit for erasing the memory for the memorizing circuit after the cage stops. In the apparatus, a start command issued through the operation from a floor or the cage inside releases the motor stopping circuit to permit the cage to restart its travel.

2 Claims, 4 Drawing Figures

EMERGENCY STOP APPARATUS FOR ELECTRIC ELEVATORS

This is a continuation of application Ser. No. 808,612, filed June 21, 1977 now abandoned.

BACKGROUND OF THE INVENTION

The present invention relates to improvements over an emergency stop apparatus for electric elevators controlled by the Static-Leonard system.

By convention, the Ward-Leonard system in which a DC motor is directly driven by a motor-generator has generally been used for the speed control of the elevator when a DC motor is used as the motor for driving the cage of the elevator. With recent development of semiconductor devices, however, the called Static-Leonard system employing static components instead of the dynamic apparatus of the motor-generator is put into practice.

The Static-Leonard system suffers from some problems relating to a momentary power stoppage, i.e. a very brief stoppage of power, when compared to the Ward-Leonard system. In the case of the Ward-Leonard system, when the AC power source is momentarily stopped in its power supply, the rotating energy of the motor-generator impedes a rapid reduction of the output voltage thereof. Therefore, the rotation of the motor continues and the cage sustains its traveling. Thus, use of the Ward-Leonard system is accompanied with little problem. On the other hand, in the Static-Leonard system, the power stoppage of the AC power source makes it impossible to control the thyristors of the static components. Further, a DC voltage is developed in the armature of the DC cage drive motor immediately after the power stoppage, and this causes a large short-circuiting current to flow through the thyristor and the AC power source. This excessive current drive a safety circuit including the excessive current relay and necessary components and the safety circuit driven brakes the motor to cause an emergency stop of the travel of the cage. Generally, when the safety circuit having, for example, the excessive current relay is operated, it is dangerous to move the cage. For this reason, the system is so designed that it is impossible to automatically restart the cage travel. Thus, when the safety circuit of this kind operates, it is impossible to restart the travel of the cage by operation from the cage inside. Accordingly, the passengers are confined to the cage. And the passengers are placed in uneasiness for a long time.

SUMMARY OF THE INVENTION

Accordingly, the primary object of the invention is to provide an emergency stop apparatus for electric elevators in which a passenger can restart the travel of the cage by operation from a floor or the inside cage when a momentary stoppage of power occurs in an AC power source.

According to one important feature of the invention, there is provided an emergency stop apparatus for electric elevators comprising: a DC motor for driving a cage and being controllingly driven by DC power source means connected to an AC power source; a power stoppage memorizing circuit which detects the power stoppage of the AC power source and memorizes the power stoppage; motor stopping means for stopping the motor when the power stoppage memorizing circuit operates; and a memory erasing circuit for erasing the memory of the memorizing circuit after the cage stops; whereby a start command issued through the operation from a floor or inside the cage releases the motor stopping means to permit the cage to restart its travel.

According to another important feature of the invention, there is provided an emergency stop apparatus for electric elevators comprising: a DC motor for driving a cage and being controlled by variable DC power source means connected to an AC power source; a safety circuit operable when trouble occurs in the variable DC power source means; a power stoppage memorizing circuit which detects the power stoppage of the AC power source and memorizes the power stoppage; motor stopping means for stopping the motor when the safety circuit operates; and a memory erasing circuit for erasing the memory of the memorizing circuit after the cage stops; whereby, if the power stoppage circuit is active when the safety circuit operates and the cage stops, a start command issued through the operation from a floor or the cage inside releases the motor stopping means to permit the cage to restart its travel.

Other objects and features of the invention will be apparent from the following description taken in connection with the accompanying drawings, in which:

DESCRIPTION OF THE PREFERRED EMBODIMENTS

Figure 1:
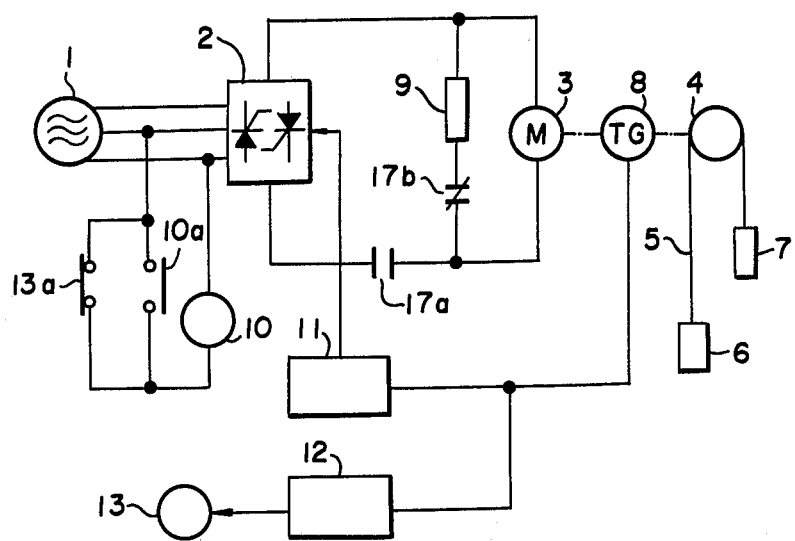
FIGS. 1 and 2 are show a schematic circuit diagram of an embodiment of an emergency stop apparatus for electric elevators according to the invention.
Figure 2:
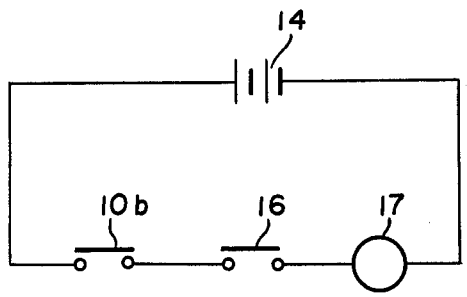

Referring now to FIGS. 1 and 2, there is shown an embodiment of an emergency stop apparatus for electric elevators employing a Static-Leonard system. In the figure, reference numeral (1) designates a three phase AC power source, numeral (2) a power rectifier connected to the power source (1), numeral (3) an armature of a DC motor for driving an elevator (its associated field winding is not shown), numeral (4) a driving sheave of a traction machine driven by the armature (3) and numeral (5) a main rope wound around the driving sheave (4) and connecting a cage (6) with a counterweight (7). Reference numeral (8) designates a tachometer generator driven by the armature (3) to produce a speed signal, numeral (9) a discharge resistor, numeral (10) a power stoppage detecting relay with normally open contacts designated by numerals (10a) and (10b), numerals (11) a control circuit for the Static-Leonard system, numeral (12) a voltage detecting circuit related to the tachometer generator (8), numeral (13) a voltage detecting relay which is deenergized when the voltage produced by the tachometer generator (8) becomes 0 and having a normally closed contact (13a), numeral (14) a DC power source such as a battery which is operable independently of power stoppage, numeral (16) a start command relay contact which is closed in response to a start command issued, and numeral (17) a contactor for a main circuit with a normally open contact (17a) and a normally closed contact (17b).

In operation, assume now that the AC power source (1) is active and the cage (6) stops. Under this condition, the tachometer generator (8) produces no output voltage and thus the voltage detecting relay (13) is not energized with the contact (13a) remaining closed. Therefore, the power stoppage detecting relay (10) is energized to close its normally open contact (10a) so that the relay (10) is self-sustained. The contact (10b) also closes at this time.

When the start command is issued and the start command relay contact (16) is closed, a circuit (14)-(10b)-(16)-(17)-(14) is completed to energize the main circuit contactor (17) so that the contact (17b) is opened and the contact (17a) is closed.

AC power from the AC power source (1) is converted into DC power by the power rectifier (2) and the DC power drives the armature (3) which in turn starts the cage (6) through the driving sheave (4). The tachometer generator (8) generates a speed signal. In response to the speed signal, the control circuit (11) controls the thyristors of the power rectifier (2) so that the speed of the armature (3), i.e. the cage (6) is controlled. At the same time, the voltage detecting circuit (12) produces an output voltage which is turn energizes the voltage detecting relay (13) to release the contact (13a), while the power stoppage relay (10) is not deenergized.

If power supply by the AC power source (1) is momentarily stopped when the cage is traveling, the power stoppage detection relay (10) is deenergized and the contacts (10a) and (10b) are opened. The open of the contact (10b) deenergizes the contactor (17) with the result that the contact (17a) is released and the armature (3) is disconnected from the power rectifier (2). Accordingly, the short-circuiting current caused by the voltage developed in the armature (3) does not flow into the power rectifier (2) and the power source (1). At the same time, the contact (17b) is closed so that current flows through (3)-(9)-(17b)-(3) and a regenerative braking torque exerts on the armature (3). At this time, a mechanical braking torque by a friction type brake (not shown) is exerted on the armature (3) to control it and then to cause an emergency stop of the cage (6). If the AC power source (1) is restored to its normal condition before the cage (6) stops, the contact (13a) is not released until the cage (6) stops and thus the power stoppage detecting relay (10) is not energized.

When the cage (6) stops, the voltage detecting relay (13) is deenergized to close the contact (13a) and the power stoppage detecting relay is energized again to close the contact (10b). If a passenger in the cage (6) pushes an advance floor button (not shown), the start command is issued to close the start command relay contact (16) and to energize the contactor (17), thus permitting the cage (6) to travel again. It will be understood that the start command relay contact (16) may be closed through the operation of a floor button.

Figure 3:
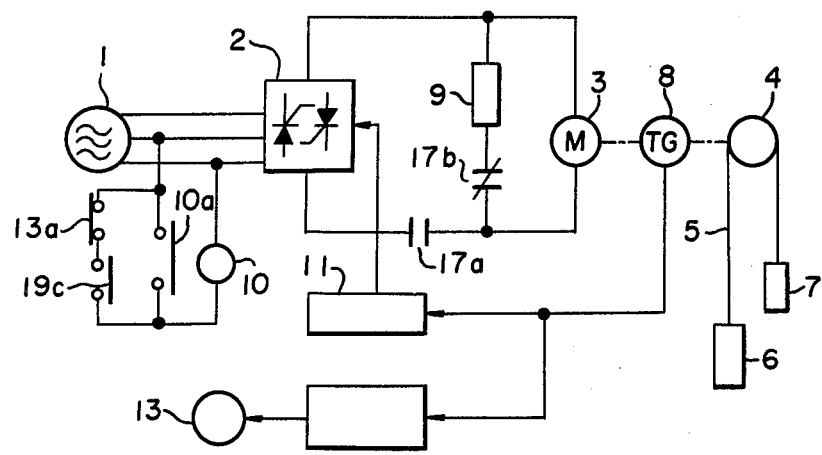
FIGS. 3 and 4 show a schematic circuit diagram of another embodiment of the emergency stop apparatus for electric elevators according to the present invention.
Figure 4:
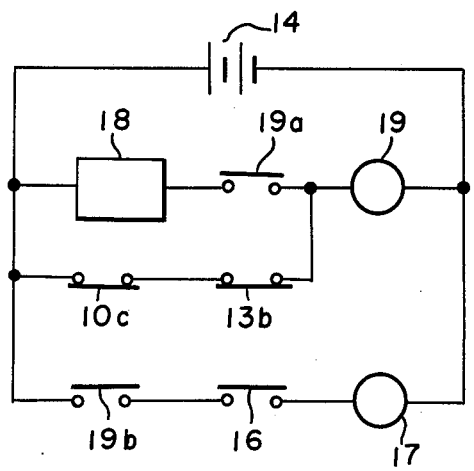

Reference will be made to FIGS. 3 and 4 illustrating another embodiment of the emergency stop apparatus for electric elevators of the invention. In the figure, reference numeral (10c) designates a normally closed contact of the power stoppage detecting relay 10, numeral 13b designates a normally closed contact of the voltage detecting relay (13), numeral (18) a safety circuit which is usually closed but opened only when excessive current detecting means, for example, detects an excessive current, and numeral (19) a safety detecting relay with its associated normally open relays (19a), (19b) and (19c).

When the cage (6) stops, the contacts (13a) and (13b) are closed so that the safety detecting relay (19) is energized through a circuit (14)-(10c)-(13b)-(19)-(14) to be self-sustained by close of the contact (19a). At this time, the safety circuit (18) is closed. The contact (19c) also is closed to complete a circuit (1)-(13a)-(19c)-(10)-(1) through which the power stoppage detecting relay (10) is energized to be self-sustained by close of the contact (10a). And the contact (19b) also is closed.

When the start command relay contact (16) is closed, the contactor (17) is energized and, as a result, the cage (6) starts its travel, as previously stated.

When the AC power source (1) stops its power supply in a moment in the travel of the cage (6), the power stoppage detecting relay (10) is deenergized to open the contact (10a) while closing the contact (10c). At this time, unless the safety circuit (18) is released, the safety detecting relay (19) is not deenergized and thus the armature (3) continues its operation, but by the power stoppage, if, for example, the short-circuiting current operates a safety apparatus (not shown) to release the safety circuit (18), the contact (13b) which has been already opened deenergizes the safety detecting relay (19) to open the contact (19b) and to deenergize the contactor (17) and finally to cause the cage (6) to come to an emergency stop.

If the power source (1) is restored when the cage (6) stops, the safety detecting relay (19) is energized through the contact (13b) to close the contact (19c) and then the power stoppage detecting relay (10) is energized again. If the advance floor button or the floor button is actuated, the cage is restarted.

While the embodiment heretofore described is related to the Static-Leonard system, the present invention may be applied to the Ward-Leonard system using, as a control power source, a static power source comprising silicon rectifiers and the like.

Additionally, although the DC power source operable independently of the interruptable AC power source (1) is used for the power source (14) for the contactor (14) actuation, the power source is not limited to such the DC power source. For example, a power source may be usable in which AC power from the power source (1) is rectified by a proper rectifier and the rectified power is appropriately delayed when the momentary power supply interruption takes place in the power source (1).

Various other modifications of the disclosed embodiments will become to person skilled in the art without departing from the spirit and scope of the invention as defined by the appended claims.

What is claimed is:

1. An emergency stop apparatus for electric elevators comprising:
   a D.C. motor for driving a cage with passengers;
   variable D.C. power source means powered by an A.C. power source and coupled to said motor for controllingly driving said motor;
   means for coupling the D.C. power source means to the motor;
   a power stoppage memorizing circuit for detecting a power stoppage of the A.C. power source and memorizing the power stoppage;
   first means for monitoring an elevator system safety function to verify a predetermined performance of said system function;

second means coupled to said first means for stopping said motor when said first means senses a malfunction;

first motor stopping means for stopping said motor to stop the cage when said power stoppage memorizing circuit detects a power stoppage;

a memory erasing circuit for automatically erasing the memory of said memorizing circuit after the cage stops when A.C. power is restored and if no safety malfunction is sensed by said first means; and means for issuing a start command through operation from an advance floor button in the cage by the passengers themselves or a floor button after the operation of said memory erasing circuit to release said motor stopping means to permit the cage to restart its travel.

2. An emergency stop apparatus for electric elevators according to claim 1, further comprising:

a safety circuit operable when a malfunction is sensed in said variable D.C. power source means;

a safety detecting circuit coupled to said safety circuit for detecting the operation of said safety circuit;

second motor stopping means for stopping said motor to stop the cage when said safety detecting circuit detects that a malfunction is sensed by said safety circuit;

a safety detection erasing circuit for momemtarily releasing the operation of said safety detecting circuit upon operation of said power stoppage memorizing circuit when the cage stops, such that when A.C. power is restored and no malfunction is sensed by said safety circuit, said safety detection circuit operates to enable issuance of said start command, and such that when A.C. power is restored and a malfunction is sensed by said safety circuit said safety detection circuit then operates to disenable issuance of said start command.

* * * * *